(12) United States Patent
Liao et al.

(10) Patent No.: US 8,111,926 B2
(45) Date of Patent: Feb. 7, 2012

(54) IMAGE PROCESSING METHOD FOR DERIVING TEXT CHARACTERISTIC IMAGE FROM INPUT IMAGE AND RELATED APPARATUS

(75) Inventors: Wu-Jie Liao, Changhua County (TW); Ting-Yuan Cheng, Taipei County (TW); Pai-Yu Tien, Taipei (TW); Hui-Jan Chien, Taipei (TW); Tsai-Hsing Chen, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 366 days.

(21) Appl. No.: 12/573,889

(22) Filed: Oct. 6, 2009

(65) Prior Publication Data

US 2011/0033109 A1    Feb. 10, 2011

(30) Foreign Application Priority Data

Aug. 10, 2009   (TW) .............................. 98126693 A (51) Int. Cl.
  *G06K 9/48*    (2006.01)
  *G06K 9/34*    (2006.01)
  *H04N 1/40*    (2006.01)

(52) U.S. Cl. ........ 382/199; 382/176; 382/270; 358/3.21

(58) Field of Classification Search .......... 382/100–320; 358/1.9, 2.1, 2.99–3.32

See application file for complete search history.

(56) References Cited

U.S. PATENT DOCUMENTS

| | | | | | |
|---|---|---|---|---|---|
| 5,317,420 | A | * | 5/1994 | Kuwahara | 358/463 |
| 5,418,862 | A | * | 5/1995 | Zheng et al. | 382/199 |
| 5,515,480 | A | * | 5/1996 | Frazier | 358/1.9 |
| 5,729,632 | A | * | 3/1998 | Tai | 382/237 |
| 5,732,146 | A | * | 3/1998 | Yamada et al. | 382/107 |
| 5,768,403 | A | * | 6/1998 | Suzuki et al. | 358/2.1 |
| 5,818,976 | A | * | 10/1998 | Pasco et al. | 382/289 |
| 5,982,911 | A | * | 11/1999 | Matsumoto et al. | 382/114 |
| 5,999,647 | A | * | 12/1999 | Nakao et al. | 382/187 |
| 6,064,769 | A | * | 5/2000 | Nakao et al. | 382/224 |
| 6,176,566 | B1 | * | 1/2001 | Amidei | 347/43 |
| 6,735,338 | B1 | * | 5/2004 | Conklin | 382/232 |
| 6,744,919 | B2 | * | 6/2004 | Said | 382/166 |
| 6,917,707 | B1 | * | 7/2005 | Kubota | 382/176 |
| 7,265,873 | B1 | * | 9/2007 | Kusumo-Rahardjo et al. | 358/2.1 |
| 7,446,817 | B2 | * | 11/2008 | Jung et al. | 348/468 |
| 7,616,340 | B2 | * | 11/2009 | Yamazaki | 358/1.8 |
| 7,948,655 | B2 | * | 5/2011 | Goto et al. | 358/2.1 |
| 8,045,809 | B2 | * | 10/2011 | Hayashi | 382/232 |
| 2002/0031263 | A1 | * | 3/2002 | Yamakawa | 382/199 |
| 2002/0080377 | A1 | * | 6/2002 | Tonami et al. | 358/1.9 |

* cited by examiner

*Primary Examiner* — Manav Seth
(74) *Attorney, Agent, or Firm* — Winston Hsu; Scott Margo (57) ABSTRACT

An image processing method for deriving text characteristic images from an input image includes: performing a plurality of edge detecting processes upon the input image to generate a plurality of edge images, respectively, and deriving a first text characteristic image according to the edge images. The image detecting processes include: performing a first edge detecting process upon the input image to derive a first edge image according to a first upper threshold and a first lower threshold, and performing a second edge detecting process upon the input image to derive a second edge image according to a second upper threshold and a second lower threshold.

18 Claims, 8 Drawing Sheets

FIG. 1

| -1 | -1 | -1 | -1 | -1 | -1 | -1 | -1 |
|----|----|----|----|----|----|----|----|
| -1 | 1  | 1  | 1  | 1  | 1  | 1  | -1 |
| -1 | 1  | 1  | 1  | 3  | 1  | 1  | -1 |
| -1 | 1  | 1  | 3  | 8  | 3  | 1  | -1 |
| -1 | 1  | 1  | 1  | 3  | 1  | 1  | -1 |
| -1 | 1  | 1  | 1  | 1  | 1  | 1  | -1 |
| -1 | -1 | -1 | -1 | -1 | -1 | -1 | -1 |

IMAGE PROCESSING METHOD FOR DERIVING TEXT CHARACTERISTIC IMAGE FROM INPUT IMAGE AND RELATED APPARATUS

BACKGROUND OF THE INVENTION

1. Field of the Invention

The present invention relates to an image processing method and an apparatus thereof, and more particularly, to an image processing method for deriving text characteristic images from an input image and a related apparatus.

2. Description of the Prior Art

After scanners capture image data, if text parts of the image data can be detected and printed with pure black ink while, non-text parts are printed with a different printing configuration, the quality and efficiency of the printing process can be greatly improved as well as the readability of the image data after being printed. In addition to using edge detection to capture text parts of an image, the conventional text detection technology also utilizes chroma detection and dot detection to exclude non-text parts. However, the computational cost of the conventional edge detection technology is high, and furthermore, the chroma detection and the dot detection is incapable of locating texts on colored backgrounds or texts nearby image patterns. Therefore, how to capture text parts within an input image swiftly and efficiently has become a research topic in this field.

SUMMARY OF THE INVENTION

According to one embodiment of the present invention, an exemplary image processing method for deriving text characteristic parts from an input image is provided. The exemplary image processing method includes: performing a plurality of edge detecting processes upon the input image to generate a plurality of edge images, respectively, wherein the image detecting processes include: performing a first edge detecting process upon the input image to derive a first edge image according to a first upper threshold and a first lower threshold, wherein the first upper threshold is larger than the first lower threshold; and performing a second edge detecting process upon the input image to derive a second edge image according to a second upper threshold and a second lower threshold, wherein the second upper threshold is larger than the second lower threshold, the second upper threshold is smaller than the first upper threshold and the second lower threshold is smaller than the first lower threshold; and deriving a first text characteristic image according to the edge images.

According to another embodiment of the present invention, an exemplary apparatus for deriving text characteristic images from an input image is provided. The exemplary apparatus includes a plurality of edge detection modules and a synthesizing module. The edge detection modules are for performing a plurality of edge detecting processes upon the input image to generate a plurality of edge images, respectively. The edge detection modules include a first edge detection module and a second edge detection module. The first edge detection module performs a first edge detecting process upon the input image to derive a first edge image according to a first upper threshold and a first lower threshold, wherein the first upper threshold is larger than the first lower threshold. The second edge detection module performs a second edge detecting process upon the input image to derive a second edge image according to a second upper threshold and a second lower threshold, wherein the second upper threshold is larger than the second lower threshold, the second upper threshold is smaller than the first upper threshold and the second lower threshold is smaller than the first lower threshold. The synthesizing module derives a first text characteristic image according to the edge images.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
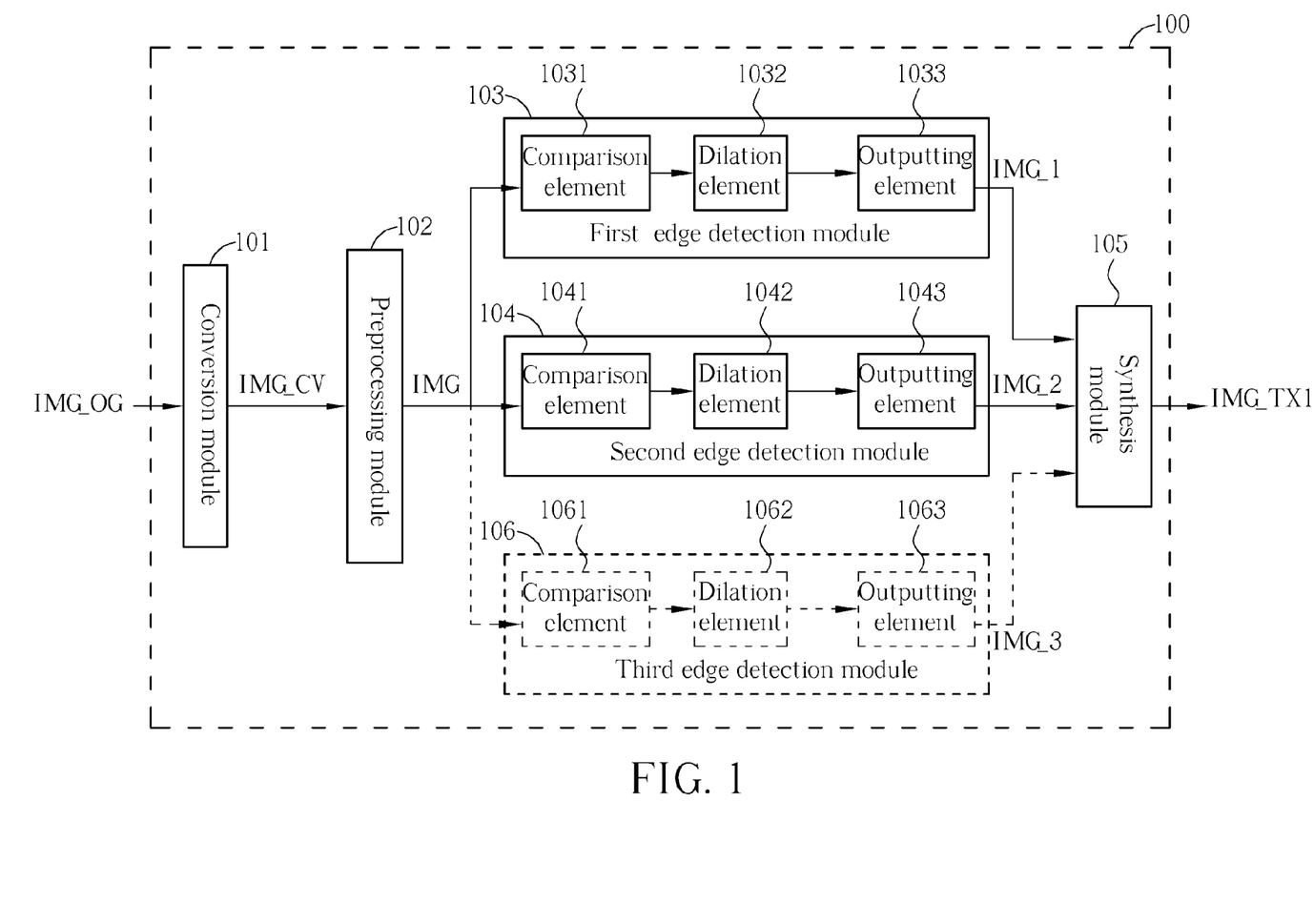
FIG. 1 is a block diagram of an image processing apparatus according to an embodiment of the present invention.

Please refer to FIG. 1, which is a block diagram of an image processing apparatus 100 according to an embodiment of the present invention. The image processing apparatus 100 includes a conversion module 101, a preprocessing module 102, a first edge detection module 103, a second edge detection module 104 and a synthesis module 105. First of all, the conversion module 101 performs a color space conversion upon an original image IMG_OG to derive a converted image IMG_CV which has luminance information of the original image IMG_OG, for example, the color space conversion can be a conversion from an RGB color space to an YCC space. Next, the preprocessing module 102 performs a preprocessing operation for the converted image IMG_CV to enhance text characteristics or reduce non-text characteristics to derive an input image IMG, wherein the preprocessing module 102 can be an operator or a digital filter to perform a convolution operation or a filtering operation for the converted image IMG_CV.

Figure 2:
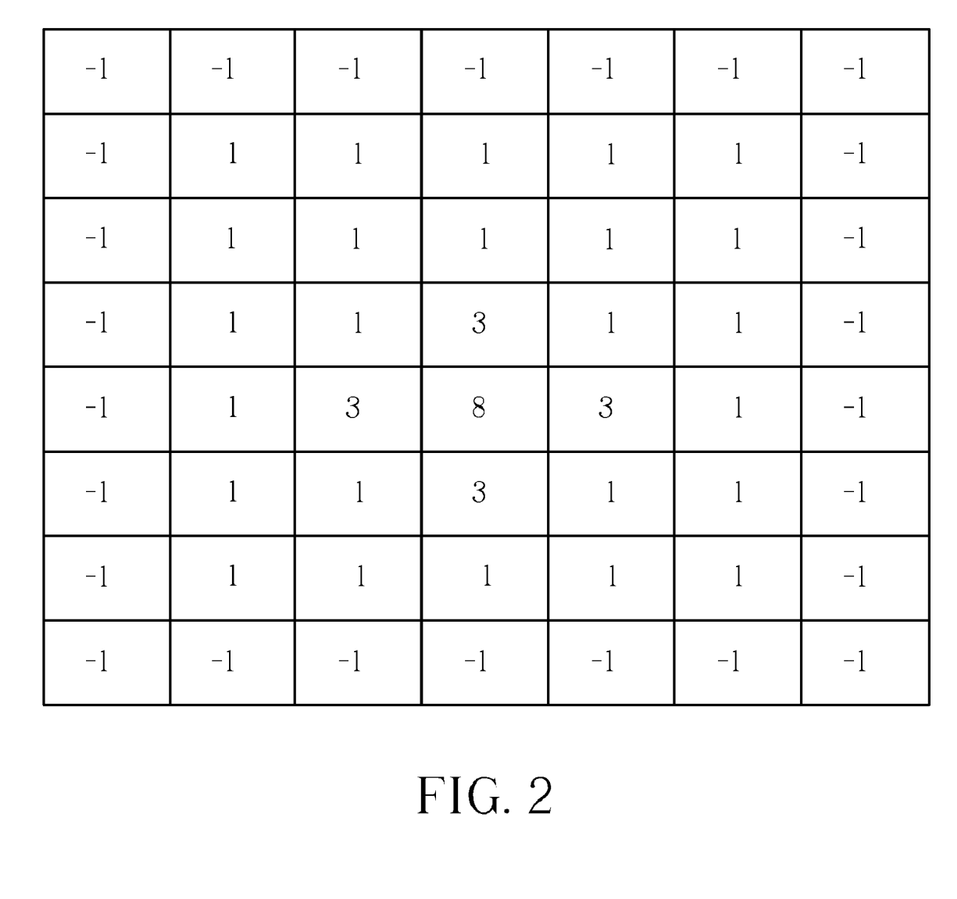
FIG. 2 is a diagram of a digital filter performing the preprocessing operation according to an embodiment of the present invention

Please refer to FIG. 2, which is a digital filter utilized for performing the preprocessing operation according to an embodiment of the present invention, where the specification thereof is 7×7. Utilizing the digital filter can enhance the low-frequency part of the converted image IMG_CV and remove the high-frequency parts. As the operation of the digital filter should be readily understand by those skilled in this field, further description is omitted here for brevity.

The first edge detection module 103 includes a comparison element 1031, a dilation element 1032 and an outputting element 1033. After receiving the input image IMG, the comparison element 1031 processes each pixel within the input image IMG according to a first upper threshold $UT_1$ and a first lower threshold $LT_1$. If the luminance of the pixel is higher than the first upper threshold $UT_1$, the comparison element 1031 categorizes the pixel as a high-luminance pixel; if the luminance of the pixel is lower than the first lower threshold $LT_1$, the comparison element 1031 categorizes the pixel as a low-luminance pixel. Please note that the first upper threshold $UT_1$ is larger than the first lower threshold $LT_1$ (i.e., $UT_1 > LT_1$). The dilation element 1032, which is coupled to the comparison element 1031, processes each high-luminance pixel and each low-luminance pixel within the input image IMG. By way of example, the dilation element 1032 categorizes all non-high-luminance pixels distant from the high-luminance pixel by a specific range as high-luminance pixels; and the dilation element 1032 categorizes all non-low-luminance pixels distant from the low-luminance pixel by a specific range as low-luminance pixels. Finally, the outputting element 1033, which is coupled to the dilation element 1032, derives the first edge image IMG_1 according to each pixel categorized as a high-luminance pixel and a low-luminance pixel simultaneously in space.

Figure 3:
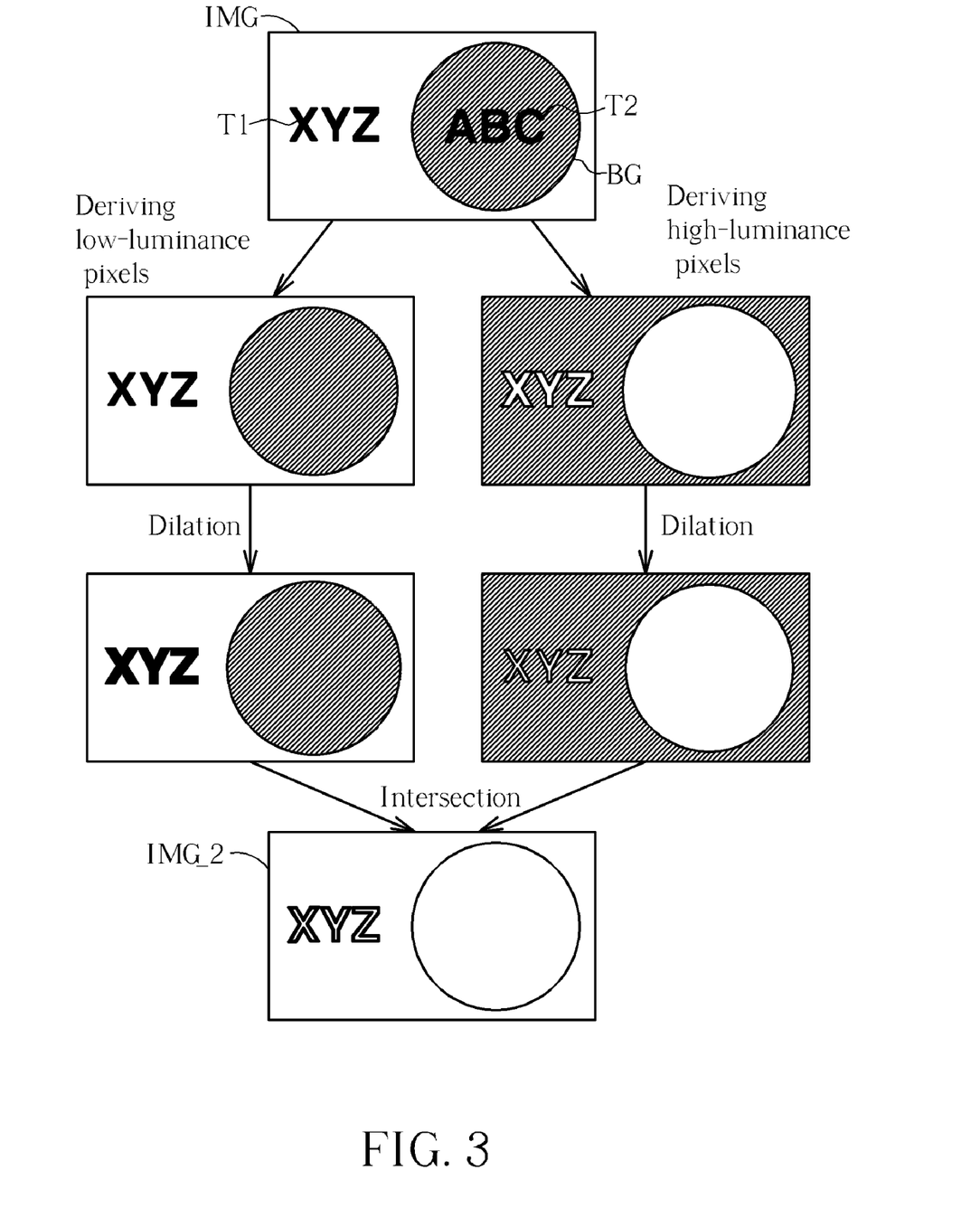
FIG. 3 is an operation diagram of a first edge detection module deriving the first edge image according to a first upper threshold and a first lower threshold.

Please refer to FIG. 3 for further details of the operation of the first edge detection module 103. FIG. 3 is an operation diagram of the first edge detection module 103 deriving the first edge image IMG_1 according to the first upper threshold $UT_1$ and the first lower threshold $LT_1$. In FIG. 3, the input image IMG has a first text T1, a second text T2 and a background image BG, wherein the first text T1 and the background image BG has the same luminance B, and the second test T2 has the lowest luminance (i.e., the darkest black color). Since the luminance B of the first text T1 and the background BG and the luminance of the second text T2 are smaller than the first lower threshold $LT_1$, the comparison element 1031 chooses all the pixels within the first text T1, the second text T2 and the background BG as low-luminance pixels (denoted as black part and slashed part in FIG. 3); likewise, only pixels outside the first text T1, the second text T2 and the background BG have luminance higher than the first upper threshold $UT_1$. Therefore, the comparison element 1031 chooses pixels outside the first text T1, the second text T2 and the background BG as high-luminance pixels (denoted as slashed part in FIG. 3). The dilation element 1032 thereby categorizes all non-high-luminance pixels distant from the high-luminance pixel by a specific range as high-luminance pixels, and categorizes all non-low-luminance pixels distant from the low-luminance pixel by a specific range as low-luminance pixels. Finally, the outputting element 1033 performs an intersection processing for all the high-luminance pixels and the low luminance pixels simultaneously (i.e., outputting each pixel categorized as high-luminance pixel and low-luminance pixel simultaneously in space) to derive the first edge image IMG_1. It can be seen from the figure that the first edge image IMG_1 has an edge part of the first text T1 and an edge part of the background image BG, since the second text T2 is located within the background image BG, the second text T2 therefore cannot be detected by the first edge detection module 103.

Figure 4:
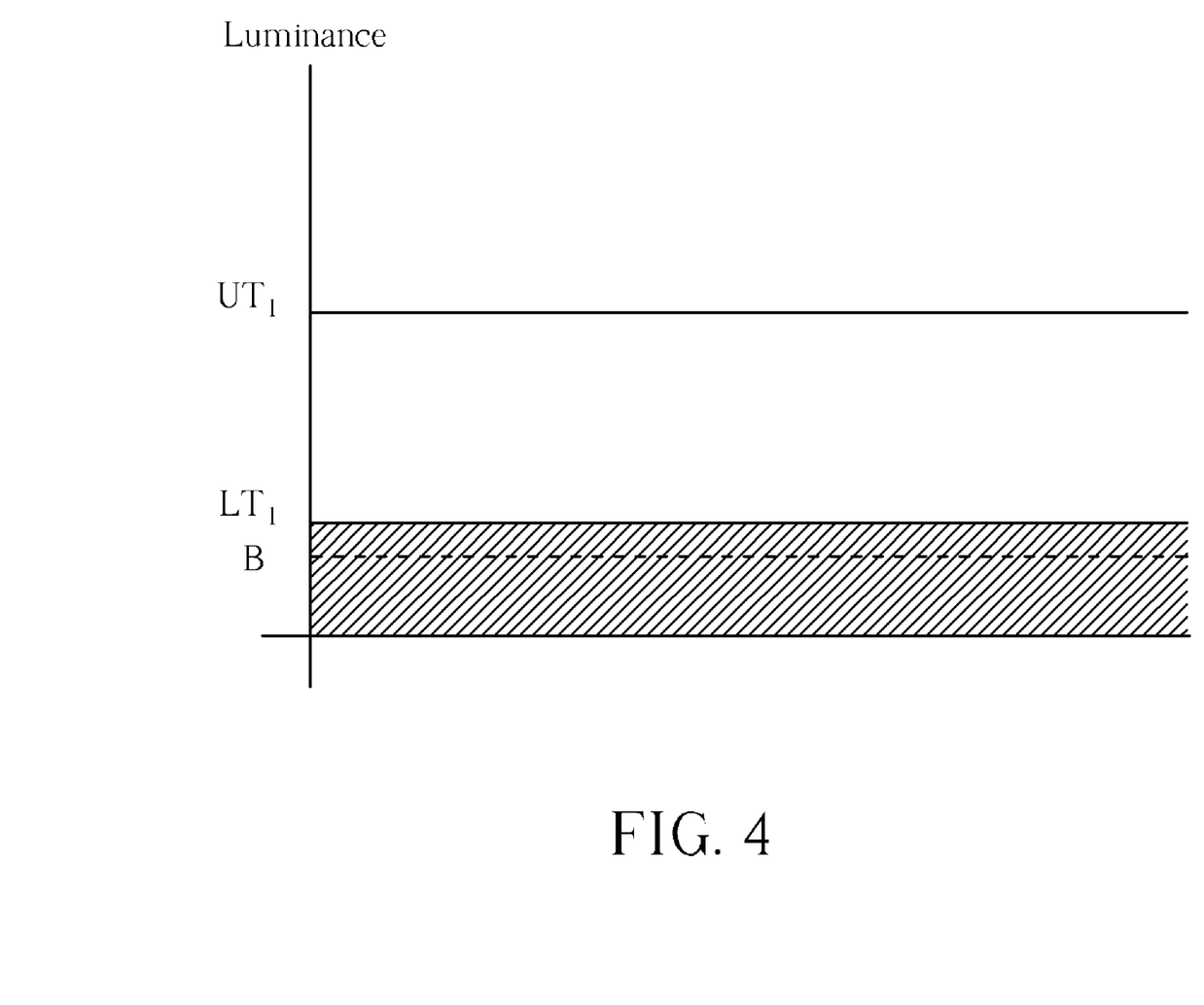
FIG. 4 illustrates a relation among a first upper threshold, a first lower threshold and a luminance in one embodiment of the present invention.

Please refer to FIG. 4 in conjunction with FIG. 3. FIG. 4 illustrates a relation among the first upper threshold $UT_1$, the first lower threshold $LT_1$ and luminance B in this embodiment. It can be seen from FIG. 4 that, since the luminance B of the first text T1 and the background BG is located in the slashed area under the first lower threshold $LT_1$, the first edge detection module 103 cannot correctly detect the second text T2, but the first text T1 can be detected properly. To further derive text characteristic images within the input image IMG properly, the image processing apparatus 100 in this embodiment thereby has a plurality of edge detection modules with different edge detection conditions, respectively.

Figure 5:
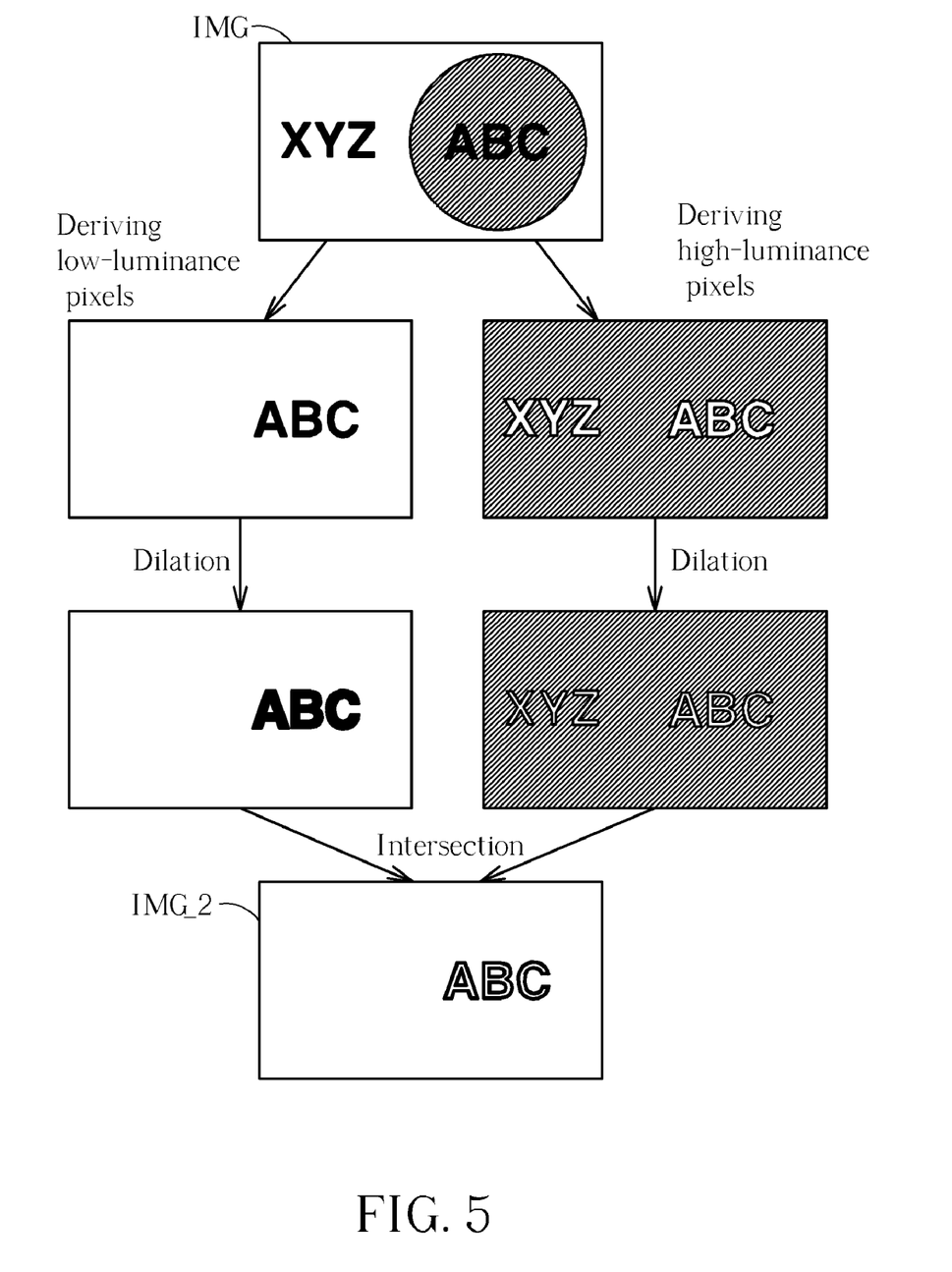
FIG. 5 is an operation diagram of a second edge detection module deriving the second edge image according to a second upper threshold and a second lower threshold.
Figure 6:
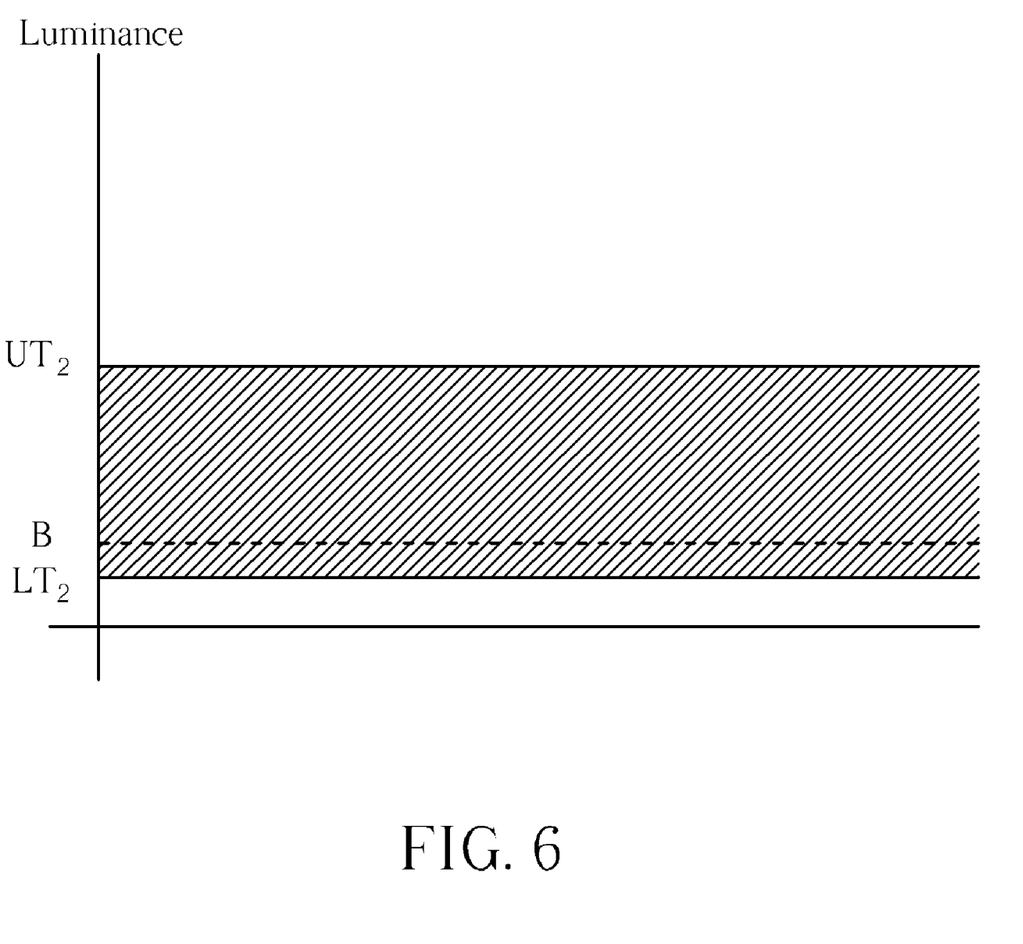
FIG. 6 illustrates a relation among a second upper threshold, a second lower threshold and a luminance in one embodiment of the present invention.

FIG. 5 is an operation diagram of the second edge detection module 104 deriving the second edge image IMG_2 according to the second upper threshold $UT_2$ and the second lower threshold $LT_2$. Since the operations and the components of the second edge detection module 104 are substantially the same as that of the first edge detection module 103, further description is omitted here for brevity. The key differences between the first edge detection module 103 and the second edge detection module 104 are the upper thresholds and the lower thresholds. For example, the second upper threshold $UT_2$ is larger than the second lower threshold $LT_2$ (i.e., $UT_2 > LT_2$), the second upper threshold $UT_2$ is smaller than the first upper threshold $UT_1$, (i.e., $UT_1 > UT_2$), and the second lower threshold $LT_2$ is smaller than the first lower threshold $LT_1$ (i.e., $LT_1 > LT_2$). It can be seen from FIG. 5 that in the second edge image IMG_2, the second text T2, which is located in the background image BG, can be successfully detected by the second edge detection module 104, but the first text T1 cannot be detected since its luminance B is larger than the second lower threshold $LT_2$. FIG. 6 illustrates a relation among the second upper threshold $UT_2$, the second lower threshold $LT_2$ and luminance B in this embodiment. It can be seen from FIG. 6 that, since the luminance B of the first text T1 is located in the slashed area between the second upper threshold $UT_2$ and the second lower threshold $LT_2$, the second edge detection module 104 cannot detect the first text T1 correctly, but is capable of detecting the second text T2 which cannot be detected by the first edge detection module 103.

Figure 7:
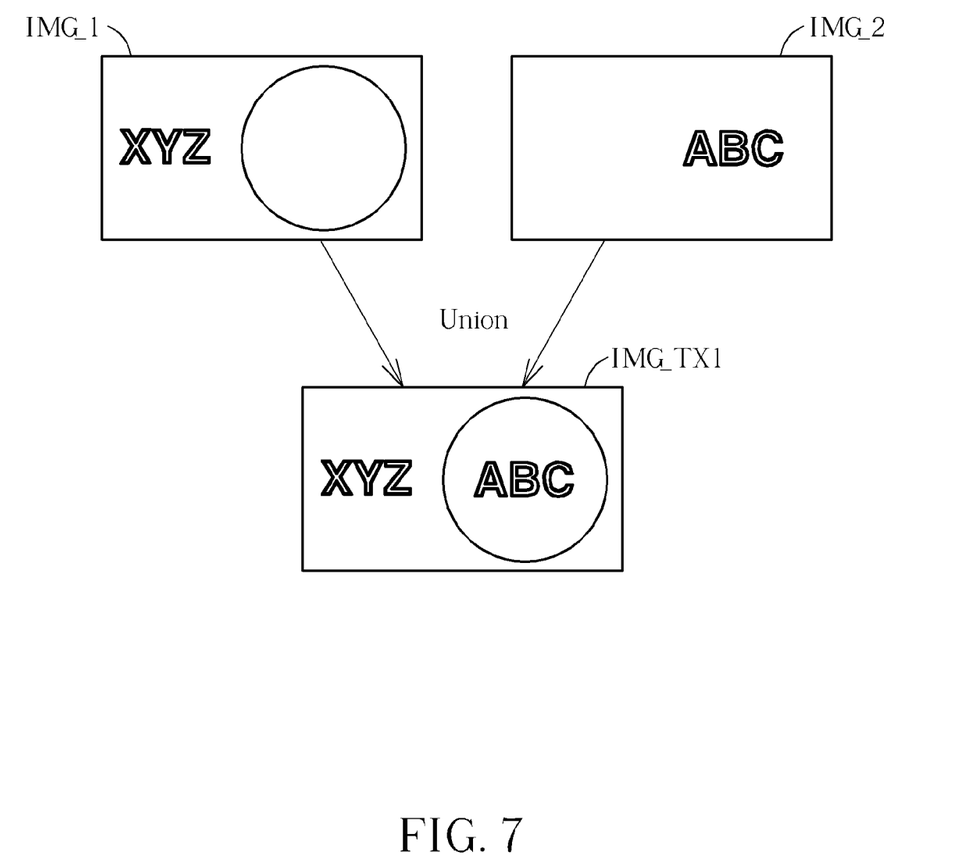
FIG. 7 is an operation diagram of the synthesis module in FIG. 1 deriving a first text characteristic image according to a first edge image and the second edge image.

Please refer to FIG. 7, which is an operation diagram of the synthesis module 105 in FIG. 1 deriving a first text characteristic image IMG_TX1 according to the first edge image IMG_1 and the second edge image IMG_2. The synthesis module 105 performs a union operation upon the first edge image IMG_1 and the second edge image IMG_2 to derive the first text characteristic image IMG_TX1. It can be seen from FIG. 7 that the first text characteristic image IMG_TX1 successfully derives the edge parts of the first text T1 and the second text T2 from the input image IMG, and since the edge of the background image BG also contains text characteristics, it is derived from the input image IMG as well.

Please note that, in this embodiment, the image processing apparatus 100 only utilizes the first edge detection module 103 to exclude the background image BG with a luminance B, and utilizes the second edge detection module 104 to exclude the issue of capturing the first text T1 which also has a luminance B. However, the present invention can also utilize different edge detection modules according to different requirements (for example, detecting a text with a specific luminance and a text within a background having a specific luminance) such that a better image processing effect can be achieved. That is, the present invention is not limited to utilizing only two edge detection modules, and other kinds of variation in design, such as using more than two edge detection modules, still obey the spirit of the present invention. For example, the image processing apparatus 100 in FIG. 1 may further comprise a third edge detection module 106, which has, just like the first and the second edge detection modules 103 and 104, a comparison element 1061, a dilation element 1062 and an outputting element 1063. The third edge detection module 106 generates a third edge image IMG_3 to the following synthesis module 105 according to a proper configuration of a third upper threshold UT3 and a third lower threshold LT3 (for example, $UT_3 > LT_3$, $UT_2 > UT_3$ and $LT_2 > LT_3$).

The aforementioned description is only a preferred embodiment of the present invention, where the preprocessing module 102 is for optimizing the quality of the input image IMG and is not necessarily required in a practical implementation of the present invention. Furthermore, as long as the input image IMG contains the luminance information of each pixel, the conversion module 101 is also not necessarily required. In other words, the conversion module 101 and the preprocessing module 102 are optional elements, and if the original image IMG_OG is a processed image itself, the conversion module 101 and/or the preprocessing module 102 can be omitted in other embodiments of the present invention.

Figure 8:
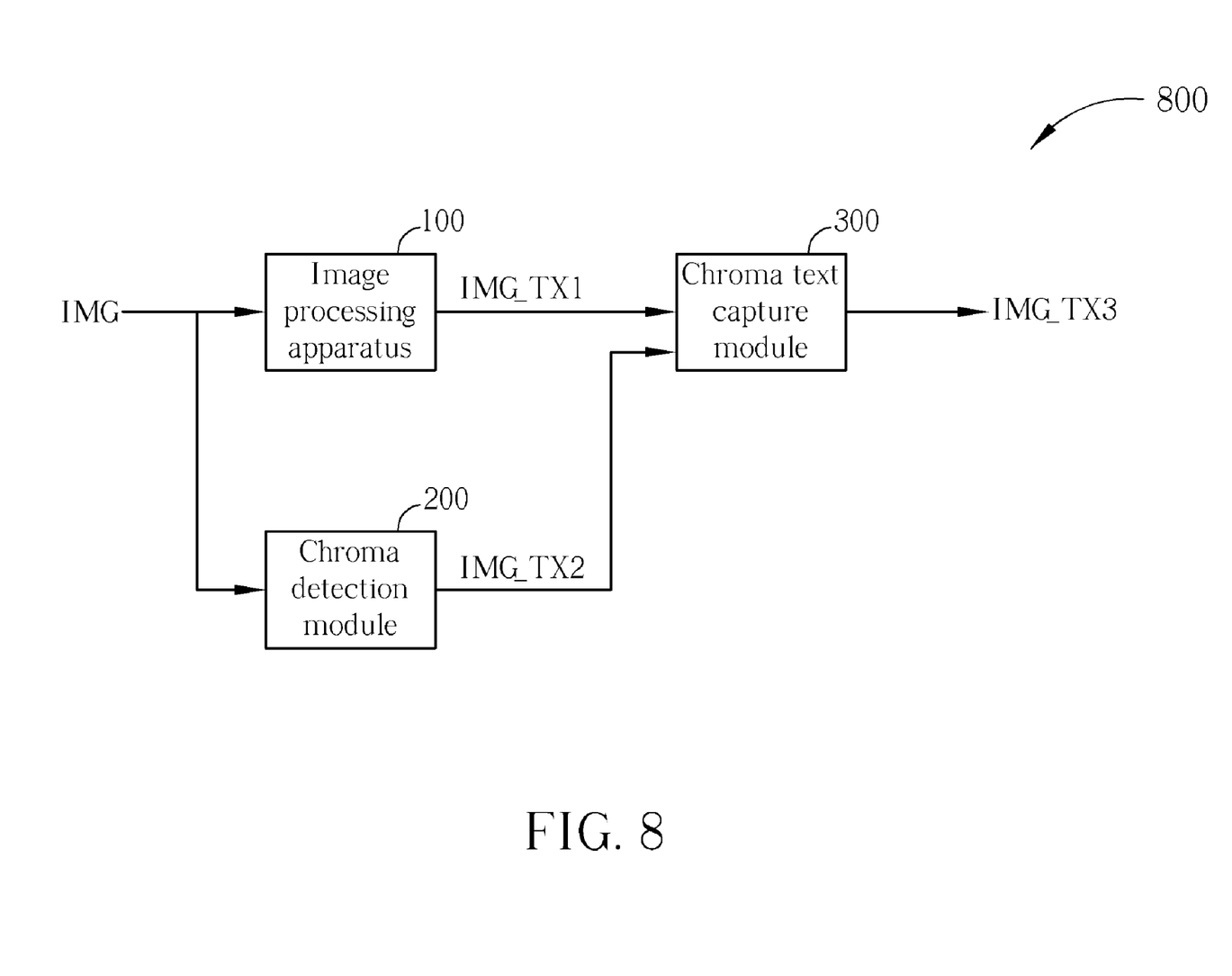
FIG. 8 is a block diagram of an apparatus for detecting texts with specific chrominance according to an embodiment of the present invention.

In addition, the present invention can also utilize a chroma detection module to detect texts with specific chrominance. Please refer to FIG. 8, which is a block diagram of an apparatus 800 for detecting texts with specific chrominance according to an embodiment of the present invention. The chroma detection module 200 performs a chroma detection for each pixel within the input image IMG. If the chrominance of the pixel is within a text chrominance range (for example, lower than a chrominance value), the chroma detection module 200 thereby categorizes the pixel as a text characteristic pixel. In the end, the chroma detection module 200 outputs all the text characteristic pixels to generate a second text characteristic image IMG_TX2. The chroma text capture module 300 is coupled to the image processing apparatus 100 and the chroma detection module 200, and is for deriving a third text characteristic image IMG_TX3 according to a union result of the first text characteristic image IMG_TX1 and the second text characteristic image IMG_TX2. For example, if it is required to derive black texts via the chroma detection module 200, a corresponding configuration can be made on the chroma detection module 200 such that the edges of the first text T1 and the background image BG in the first text characteristic image IMG_TX1 can be eliminated, and only the edge of the second text T2, which is pure black, is left in the image. Likewise, the chroma detection module 200 can also derive only the chroma text of the first text T1 via a different configuration.

To summarize, the present invention provides an image processing method and a related apparatus capable of deriving text characteristic images from an input image. With proper configuration of thresholds, a plurality of edge detection operations can derive a plurality of edge images from an input image. After the edge images are further processed, images of text characteristics can be captured swiftly and efficiently. Additionally, the present invention can operate in conjunction with a chroma detection operation and derive texts on colored backgrounds or texts nearby image patterns.

Those skilled in the art will readily observe that numerous modifications and alterations of the device and method may be made while retaining the teachings of the invention.

What is claimed is:

1. An image processing method for deriving text characteristic images from an input image, comprising:
    performing a plurality of edge detecting processes upon the input image to generate a plurality of edge images, respectively, comprising:
        performing a first edge detecting process of the edge detecting processes upon the input image to derive a first edge image of the edge images according to a first upper threshold and a first lower threshold, wherein the first upper threshold is larger than the first lower threshold; and
        performing a second edge detecting process of the edge detecting processes upon the input image to derive a second edge image of the edge images according to a second upper threshold and a second lower threshold, wherein the second upper threshold is larger than the second lower threshold, the second upper threshold is smaller than the first upper threshold and the second lower threshold is smaller than the first lower threshold; and
    deriving a first text characteristic image according to the edge images.

2. The image processing method of claim 1, further comprising:
    performing a color space conversion upon an original image to derive a converted image; and
    performing a preprocessing operation upon the converted image to enhance text characteristics or reduce non-text characteristics to derive the input image.

3. The image processing method of claim 2, wherein the preprocessing operation is a convolution operation or a filtering operation.

4. The image processing method of claim 2, wherein the color space conversion is a conversion from an RGB color space to an YCC color space.

5. The image processing method of claim 1, further comprising:
    performing a chroma detection upon the input image to derive a second text characteristic image, wherein the chroma detection comprises:
        for each pixel within the text characteristic image:
            categorizing the pixel as a text characteristic pixel if the chrominance of the pixel is within a text chrominance range; and
            outputting all text characteristic pixels to generate the second text characteristic image; and
        deriving a third text characteristic image according to the first text characteristic image and the second text characteristic image.

6. The image processing method of claim 5, wherein the step of deriving the third text characteristic image according to the first text characteristic image and the second text characteristic image comprises:
    deriving the third text characteristic image according to an intersection result of the first text characteristic image and the second text characteristic image.

7. The image processing method of claim 1, wherein the first edge detecting process comprises:
    for each pixel within the input image:
        categorizing the pixel as a high-luminance pixel if a luminance of the pixel is higher than the first upper threshold; and
        categorizing the pixel as a low-luminance pixel if the luminance of the pixel is lower than the first lower threshold;
    performing a dilation process upon each high-luminance pixel and each low-luminance pixel within the input image, comprising:
        categorizing all non-high-luminance pixels distant from the high-luminance pixel by a specific range as high-luminance pixels; and
        categorizing all non-low-luminance pixels distant from the low-luminance pixel by a specific range as low-luminance pixels; and
    for all high-luminance pixels and low-luminance pixel within the input image after the dilation process, deriving the first edge image according to each pixel that is categorized as a high-luminance pixel and a low-luminance pixel simultaneously in space.

8. The image processing method of claim 1, wherein the second edge detecting process comprises:
for each pixel within the input image:
categorizing the pixel as a high-luminance pixel if a luminance of the pixel is higher than a second upper threshold; and
categorizing the pixel as a low-luminance pixel if the luminance of the pixel is lower than a second lower threshold;
performing a dilation process upon each high-luminance pixel and each low-luminance pixel within the input image, comprising:
categorizing all non-high-luminance pixels distant from the high-luminance pixel by a specific range as high-luminance pixels; and
categorizing all non-low-luminance pixels distant from the low-luminance pixel by a specific range as low-luminance pixels; and
for all high-luminance pixels and low-luminance pixel within the input image after the dilation process, deriving the second edge image according to each pixel that is categorized as a high-luminance pixel and a low-luminance pixel simultaneously in space.

9. The image processing method of claim 1, wherein the step of deriving the first text characteristic image according to the edge images comprises:
deriving the first text characteristic image according to a union result of the edge images.

10. An apparatus for deriving text characteristic images from an input image, comprising:
a plurality of edge detection modules, for performing a plurality of edge detecting processes upon the input image to generate a plurality of edge images, respectively, wherein the edge detection modules comprise:
a first edge detection module, for performing a first edge detecting process upon the input image to derive a first edge image of the edge images according to a first upper threshold and a first lower threshold, wherein the first upper threshold is larger than the first lower threshold; and
a second edge detection module, for performing a second edge detecting process upon the input image to derive a second edge image of the edge images according to a second upper threshold and a second lower threshold, wherein the second upper threshold is larger than the second lower threshold, the second upper threshold is smaller than the first upper threshold and the second lower threshold is smaller than the first lower threshold; and
a synthesizing module, coupled to the edge detection modules, for deriving a first text characteristic image according to the edge images.

11. The apparatus of claim 10, further comprising:
a conversion module, for performing a color space conversion upon an original image to derive a converted image; and
a preprocessing module, coupled to the conversion module and the edge detection modules, for performing a preprocessing operation upon the converted image to enhance text characteristics or reduce non-text characteristics to derive the input image.

12. The apparatus of claim 11, wherein the preprocessing operation is a convolution operation or a filtering operation.

13. The apparatus of claim 11, wherein the color space conversion is a conversion from an RGB color space to an YCC color space.

14. The apparatus of claim 10, further comprising:
a chroma detection module, for performing a chroma detection upon each pixel within the input image, wherein if a chrominance of the pixel is within a text chrominance range, the chroma detection module categorizes the pixel as a text characteristic pixel, and the chroma detection module outputs all text characteristic pixels to generate a second text characteristic image; and
a chroma text capture module, for deriving a third text characteristic image according to the first text characteristic image and the second text characteristic image.

15. The apparatus of claim 14, wherein the chroma text capture module derives a third text characteristic image according to an intersection result of the first text characteristic image and the second text characteristic image.

16. The apparatus of claim 10, wherein the first edge detection module comprises:
a comparison element, for processing each pixel within the input image, wherein if a luminance of the pixel is higher than a first upper threshold, the comparison element categorizes the pixel as a high-luminance pixel; if the luminance of the pixel is lower than a first lower threshold, the comparison element categorizes the pixel as a low-luminance pixel;
a dilation element, coupled to the comparison element, for performing a dilation process upon each high-luminance pixel and each low-luminance pixel within the input image, wherein the dilation element categorizes all non-high-luminance pixels distant from the high-luminance pixel by a specific range as high-luminance pixels; and the dilation element categorizes all non-low-luminance pixels distant from the low-luminance pixel by a specific range as low-luminance pixels; and
an outputting element, coupled to the dilation element, for deriving the first edge image according each pixel that is categorized as a high-luminance pixel and a low-luminance pixel simultaneously in space.

17. The apparatus of claim 10, wherein the second edge detection module comprises:
a comparison element, for processing each pixel within the input image, wherein if a luminance of the pixel is higher than a second upper threshold, the comparison element categorizes the pixel as a high-luminance pixel; if the luminance of the pixel is lower than a second lower threshold, the comparison element categorizes the pixel as a low-luminance pixel;
a dilation element, coupled to the comparison element, for performing a dilation process upon each high-luminance pixel and each low-luminance pixel within the input image, wherein the dilation element categorizes all non-high-luminance pixels distant from the high-luminance pixel by a specific range as high-luminance pixels; and the dilation element categorizes all non-low-luminance pixels distant from the low-luminance pixel by a specific range as low-luminance pixels; and
an outputting element, coupled to the dilation element, for deriving the second edge image according to each pixel that is categorized as a high-luminance pixel and a low-luminance pixel simultaneously in space.

18. The apparatus of claim 10, wherein the synthesis module derives the first text characteristic image according to a union result of the edge images.

* * * * *